United States Patent [19]

Kim

[11] Patent Number: 5,287,170
[45] Date of Patent: Feb. 15, 1994

[54] BROADCASTING SIGNAL DETECTING CIRCUIT FOR SECAM AND PAL SIGNAL FORMATS

[75] Inventor: Yong-jin Kim, Suwon, Rep. of Korea

[73] Assignee: Samsung Electronics Co. Ltd., Kyunggi-do, Rep. of Korea

[21] Appl. No.: 851,205

[22] Filed: Mar. 13, 1992

[30] Foreign Application Priority Data

Aug. 17, 1991 [KR] Rep. of Korea .................... 91-13013

[51] Int. Cl.⁵ .................... H04N 11/20; H04N 9/47
[52] U.S. Cl. .................... 348/641; 348/691; 348/506
[58] Field of Search .................... 358/11, 20, 19, 23, 358/24, 140, 14, 18, 188, 12; H04N 9/47, 9/50, 11/20

[56] References Cited

U.S. PATENT DOCUMENTS

| | | | |
|---|---|---|---|
| 4,240,102 | 12/1980 | Groeneweg | 358/11 |
| 4,438,451 | 3/1984 | Hinn | 358/11 |
| 4,472,731 | 9/1984 | van Gurp | 358/11 |

FOREIGN PATENT DOCUMENTS

| | | | |
|---|---|---|---|
| 0156096 | 9/1984 | Japan | 358/11 |
| 63-27187 | 2/1988 | Japan | H04N 9/47 |
| 2-288586 | 11/1990 | Japan | H04N 11/20 |

Primary Examiner—Victor R. Kostak
Assistant Examiner—Chris Grant
Attorney, Agent, or Firm—Sughrue, Mion, Zinn, Macpeak & Seas

[57] ABSTRACT

A broadcasting signal detecting circuit of a SECAM system can easily determine whether the received broadcasting is from a PAL or SECAM system in accordance with the existence of a color burst at the position of a delayed burst gate pulse, using the fact that within the back porch of the horizontal sync signal, the color burst loading period is different.

6 Claims, 4 Drawing Sheets

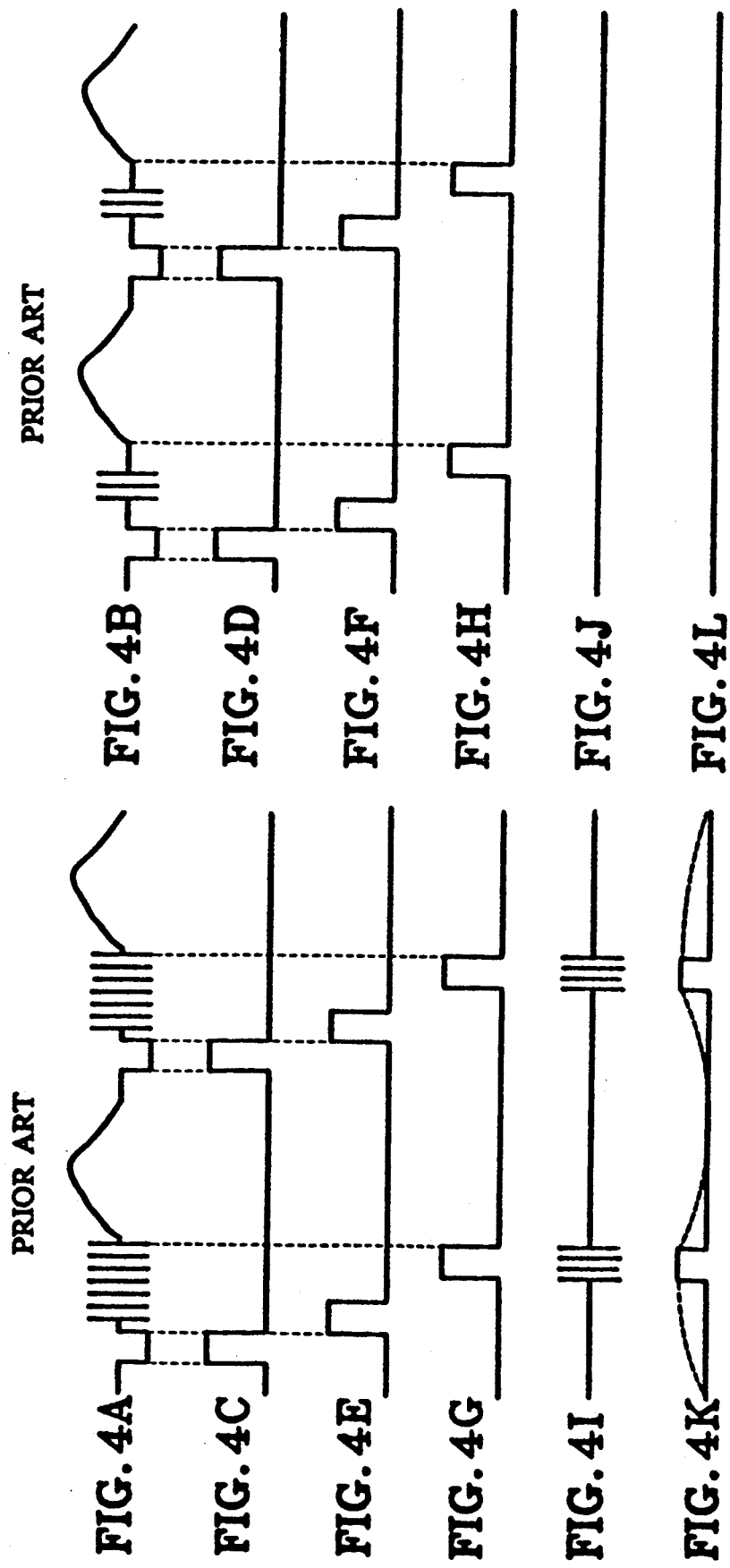

BROADCASTING SIGNAL DETECTING CIRCUIT FOR SECAM AND PAL SIGNAL FORMATS

BACKGROUND OF THE INVENTION

The present invention relates to a broadcasting signal detecting circuit in a broadcasting receiver, and particularly to a circuit for detecting the broadcasting signals of a SECAM system in accordance with the existence or absence of a color burst signal within a predetermined period in video cassette recorders or television receivers for PAL system.

European countries adopt either the phase-alternating line (PAL) system or the sèquentielle à mémoire (SECAM) system as their standard television broadcasting system.

Accordingly, television broadcasting receivers, e.g., a TV receiver, a video tape recorder, and a camcoder now on the market, have circuitry which enables the receiver to receive signals of both the above-mentioned systems. In such a double-broadcasting receiver, a circuit is required to distinguish whether the received TV signal is of the PAL system or the SECAM system.

A circuit for detecting SECAM signals is illustrated in FIG. 1. The circuit can be used, for example, in a PAL video tape recorder which can also record SECAM signals.

Referring to FIG. 1, a first amplifier 10 amplifies only a color burst signal from input color signals entered from an unshown signal input source by gating in accordance with a burst gate pulse BGP. That is, the BGP is input to the first amplifier 10 as a control input. The amplifier 10 only outputs the input color signal when the BGP at the control input is high.

Here, the gating is carried out because the signal entered from the signal input source, i.e., the SECAM or PAL signal, has a sub-modulated subcarrier at the burst flag.

The first amplifier 10 has a 4.5 MHz cut-off frequency. Filter 20 passes only those signals output from amplifier 10 that are within the cut-off frequency.

At this time, when the received signal is of a SECAM system, since the color burst frequency is alternately converted into 4.40625 MHz and 4.2 MHz every horizontal period, the output from filter 20 is amplitude-modulated as shown in FIG. 2A. Then, the amplitude-modulated signal is detected and flattened by a first detector 30, as illustrated in FIG. 2B.

Since the amplitude of the output from first detector 30 differs for each horizontal period, a 7.8 KHz signal corresponding to half of the horizontal frequency (½H) is amplified by a second amplifier 40. Then, when the amplified signal is again detected and flattened in a second detector 50, a DC voltage as shown in FIG. 2C can be obtained.

A comparator 60 outputs a logic "high" which results from comparing the output signal of second detector 50 shown in FIG. 2C with a reference voltage Vref.

On the other hand, in case of a PAL signal, since the subcarrier is constantly 4.4 MHz, and the amplitude is not modulated, a signal such as shown in FIG. 2D is output from filter 20.

The output signal (FIG. 2E) of first detector 30 which receives the output signal (FIG. 2D) of filter 20 has no 7.8 MHz component, but does have a horizontal frequency component.

Since the output signal of second amplifier 40 is small, the detected and flattened output from second detector 50 shown in FIG. 2F is also small. Thus, the final DC output voltage becomes a logic "low".

Therefore, comparator 60 outputs a logic "high" for SECAM signals, and a logic "low" for PAL signals. Thus, it is possible to determine whether a SECAM or a PAL signal has been received.

Also, Japanese patent publication No. sho 63-27187 discloses a signal discriminating circuit which determines whether a signal is of the PAL or SECAM systems. Here, using the difference between voltage levels which correspond to the burst signal frequency of each broadcasting system, the output voltage is fixed to be an identical DC voltage during the burst period, and to be a predetermined different voltage during periods besides the burst period.

However, the above-described conventional broadcasting signal detecting circuits have problems in that malfunctions may occur according to peculiarities the broadcasting area or component variations in the applied circuitry.

SUMMARY OF THE INVENTION

Therefore, it is the object of the present invention to provide a broadcasting signal detecting circuit for detecting a SECAM signal in accordance with the existence or absence of a color burst within a predetermined period, using the fact that the period for loading the color burst is different in a broadcasting receiver for a PAL system.

To achieve the above and other objects of the present invention, there is provided a broadcasting signal detecting circuit for detecting a first TV broadcasting signal amongst the first TV broadcasting signal including a first color sync signal which has a predetermined width spaced apart from a horizontal sync signal by a predetermined interval, and has alternately differing frequencies per each horizontal period, and a second TV broadcasting signal including a second color sync signal which has a constant width, spaced apart from a horizontal sync signal by a predetermined interval, within the predetermined width of a first color sync signal of the first TV broadcasting signal, and has an identical frequency per horizontal period, the circuit comprises:

delay means for outputting a burst gate pulse delayed by a predetermined time from the horizontal sync signal;

separating means for separating the first color sync signal of the first TV broadcasting signal in response to the burst gate pulse of the delay means;

integrating means for integrating the output of the separator to be a DC level; and comparing means for comparing the DC output level from the integrating means with a predetermined reference level, to determine whether the signal is the first TV broadcasting signal or the second TV broadcasting signal.

BRIEF DESCRIPTION OF THE DRAWINGS

Other objects and advantages of the present invention will become more apparent by the following description with reference to accompanying drawings, in which:

FIGS. 4A through 4L are operational waveforms of the broadcasting signal detecting circuit shown in FIG. 3.

DETAILED DESCRIPTION OF THE INVENTION

Figure 1:
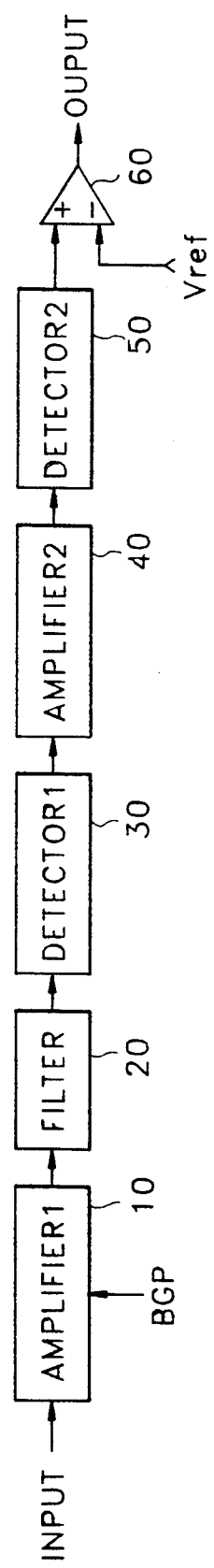
FIG. 1 is a block diagram showing the construction of a conventional broadcasting signal detecting circuit.
Figure 2A:
FIGS. 2A through 2F are operational waveforms of the broadcasting signal detecting circuit shown in FIG. 1.
Figure 2B:
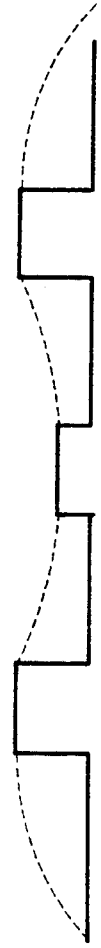
Figure 2C:
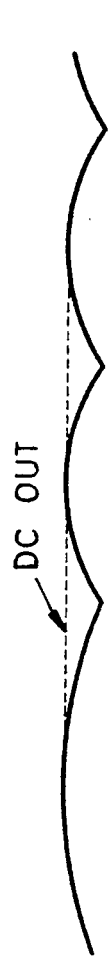
Figure 2D:
Figure 2E:
Figure 2F:
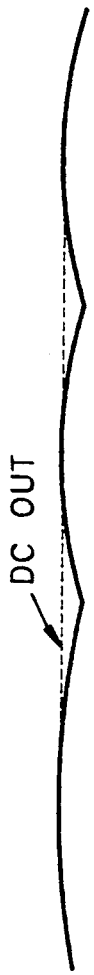
Figure 3:
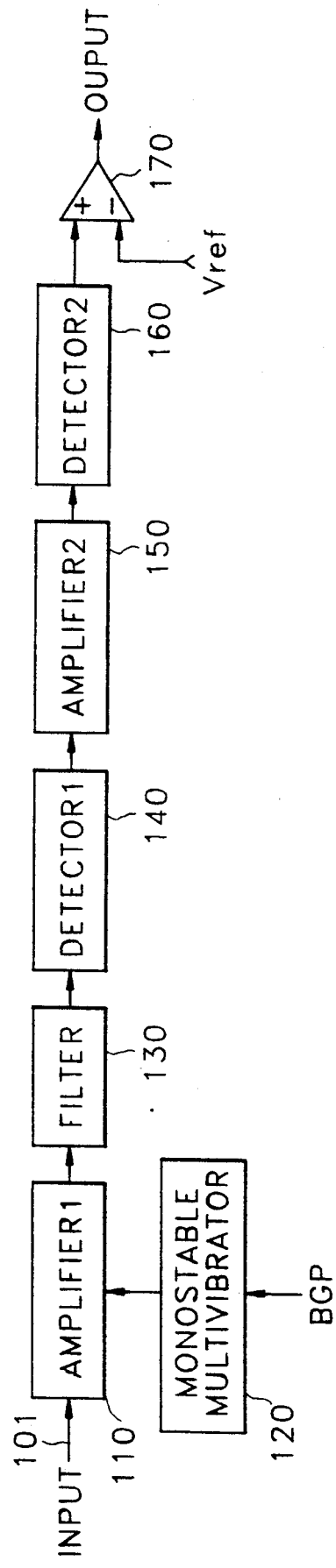
FIG. 3 is a block diagram showing the construction of a broadcasting signal detecting circuit according to the present invention.

Referring to FIG. 3, a preferred embodiment of a broadcasting signal detecting circuit according to the present invention will be described.

An input signal source, not shown, is coupled to an input of a first amplifier 110 and provides a data input 101 to the amplifier 110. The input of a monostable multivibrator MMV 120 is connected to a pulse generator (not shown) for outputting burst gate pulses BGPs, and the output of the MMV 120 is connected to the control input of first amplifier 110. The input of a filter 130 is connected to the output of the first amplifier 110, and the output is connected to the input of first detector 140. The input of a second amplifier 150 is connected to the output of first detector 140, and the output is connected to the input of a second detector 160. The non-inverting input of a comparator 170 is connected to the output of second detector 160, and the inverting input is tied to the output of a power source (not shown) for supplying a reference voltage Vref. Then, a final DC output is supplied through the output of comparator 170.

The operation of FIG. 3 will be described with reference to the operational waveforms shown in FIG. 4.

In FIG. 3, first amplifier 110 receives a well known SECAM or PAL signal respectively shown in FIGS. 4A and 4B from the signal input source which supplies a composite video signal. Then, only a color burst signal is amplified by first amplifier 110 in accordance with a delayed BGP from MMV 120.

The signals illustrated in FIGS. 4C and 4D are the composite sync signals of SECAM and PAL signals, respectively. The signals in FIGS. 4E and 4F represent the burst gate pulse output from the pulse generator. The waveform of monostable multivibrator 120 is illustrated in FIGS. 4G and 4H. Here, since the color burst signals of SECAM and PAL signals differ in their loading period during a horizontal blanking period, the SECAM signal has a color burst signal during the delayed burst gate pulse, and the PAL signal has no such color burst signal.

That is, a SECAM signal is loaded for approximately 4.6 μsec which corresponds to the whole back porch section of a horizontal sync pulse during a horizontal blanking period, and a PAL signal is loaded for only approximately 2.4 μsec.

Accordingly, among the output signals of first amplifier 110, filter 130 passes only the color burst signal within the 4.5 MHz passband.

When a SECAM signal is input at input 101, the output signal of filter 130 is illustrated in FIG. 4I. For a PAL signal, there is no output since during the delayed BGP period, the color burst signal does not exist in the output of filter 130, as shown in FIG. 4J.

First detector 140 detects the envelope of the color burst signal by receiving the output signal of filter 130. When the output signal of first detector 140 is a SECAM signal, a 15.6 KHz component exists as shown in FIG. 4K. When it is a PAL signal, the 15.6 KHz component does not exist, as shown in FIG. 4L.

Second amplifier 150 amplifies the output signal of first detector 140, and the amplified signal is then detected and flattened again by second detector 160, thereby being output as a DC voltage.

Comparator 170 is a non-inverting comparator, which compares the DC level output from second detector 160 with a predetermined reference voltage Vref.

The output of comparator 170 is a logic "high" for SECAM signals, and a logic "low" for PAL signals. As a result, a receiver utilizing this circuit can recognize whether the signal is a SECAM signal or a PAL signal in accordance with the logic signal from comparator 170.

As described above, in the broadcasting signal detecting circuit of a SECAM system according to the present invention, a received SECAM signal can be easily detected in accordance with the existence or absence of the color burst during the delayed burst gate pulse, using the differing periods for loading the color burst, so that malfunctions can be decreased, and the reliability of the product can be enhanced.

What is claimed is:

1. A broadcasting signal detecting circuit for detecting a first TV broadcasting signal amongst said first TV broadcasting signal which includes a first color sync signal which has a predetermined width spaced apart from a horizontal sync signal by a predetermined interval, and has alternately differing frequencies per each horizontal period, and a second TV broadcasting signal which includes a second color sync signal which has a constant width, spaced apart from a horizontal sync signal by a predetermined interval, within said predetermined width of said first color sync signal of said first TV broadcasting signal, and has an identical frequency per horizontal period, said circuit comprising:

outputting means for outputting a burst gate pulse delayed by a predetermined time from said horizontal sync signal, such that said burst gate pulse occurs completely inside said first color sync signal and completely outside said second color sync signal;

separating means for separating said first color sync signal of said first TV broadcasting signal in response to said burst gate pulse of said outputting means;

integrating means for integrating the output of said separator to be a DC level; and comparing means for comparing the DC output level from said integrating means with a predetermined reference level, to determine whether the signal is said first TV broadcasting signal or said second TV broadcasting signal.

2. A broadcasting signal detecting circuit as claimed in claim 1, wherein said separating means comprises:

a first amplifier for detecting said first color sync signal of said first TV broadcasting signal in response to said burst gate pulse of said outputting means; and a band-pass filter for passing a predetermined frequency component among the outputs of said first amplifier.

3. A broadcasting signal detecting circuit as claimed in claim 2, wherein said integrating means comprises:

a first detector for detecting the envelope of the signal from said band-pass filter;

a second amplifier for amplifying the output signal of said first detector; and a second detector for integrating the signal from said second amplifier.

4. A broadcasting signal detecting circuit as claimed in claim 1, wherein said outputting means comprises:

a pulse generator for generating said burst gate pulse; and a monostable multivibrator for delaying said burst gate pulse from said horizontal sync signal by a predetermined time.

5. A broadcasting signal detecting circuit as claimed in claim 1, wherein said first TV broadcasting signal is of a SECAM system, and said second TV broadcasting signal is of a PAL system.

6. A broadcasting signal detecting circuit which detects whether a received broadcasting signal is of a first standard television broadcasting system or a second standard television broadcasting system, said circuit comprising:

outputting means for providing an output only if said received broadcasting signal is of said first standard television broadcasting system; and comparator means for receiving an output from said outputting means and comparing said output with a predetermined reference value in order to detect whether said received broadcasting signal is of said first or said second standard television broadcasting systems;

wherein said outputting means includes a delay means for delaying a burst gate pulse by a predetermined time, and wherein said delayed burst gate pulse is set to occur completely outside of a time interval in which the color sync signal of a received broadcasting signal of the second standard television broadcasting system occurs.

* * * * *